(12) United States Patent
Xie

(10) Patent No.: US 9,904,102 B2
(45) Date of Patent: Feb. 27, 2018

(54) COLOR FILM SUBSTRATES AND THE TRANSFLECTIVE LIQUID CRYSTAL DEVICES (LCDS) HAVING WIDE VIEWING ANGLE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 184 days.

(21) Appl. No.: 14/901,025

(22) PCT Filed: Dec. 3, 2015

(86) PCT No.: PCT/CN2015/096267
§ 371 (c)(1),
(2) Date: Dec. 27, 2015

(87) PCT Pub. No.: WO2017/088205
PCT Pub. Date: Jun. 1, 2017

(65) Prior Publication Data
US 2017/0199426 A1    Jul. 13, 2017

(30) Foreign Application Priority Data
Nov. 27, 2015  (CN) .......................... 2015 1 0852734

(51) Int. Cl.
*G02F 1/1335*  (2006.01)
*G02F 1/1343*  (2006.01)
(Continued)

(52) U.S. Cl.
CPC .... *G02F 1/133555* (2013.01); *G02F 1/13363* (2013.01); *G02F 1/13439* (2013.01); *G02F 1/133514* (2013.01); *G02F 1/133533* (2013.01); *G02F 1/133553* (2013.01); *G02F 2001/133302* (2013.01); *G02F 2001/133531* (2013.01); *G02F 2001/133565* (2013.01);
(Continued)

(58) Field of Classification Search
CPC ..................... G02F 1/133553; G02F 1/133555
See application file for complete search history.

(56) References Cited

U.S. PATENT DOCUMENTS

2006/0187388 A1* 8/2006 Ohyama ........... G02F 1/133555
349/114
2008/0259259 A1* 10/2008 Otake ............... G02F 1/133555
349/117

* cited by examiner

*Primary Examiner* — Wen-Ying P Chen
(74) *Attorney, Agent, or Firm* — Andrew C. Cheng

(57) ABSTRACT

A color film substrate and a transflective LCD having wide viewing angle are disclosed. The LCD includes a transmission area, and a reflective area. The LCD also includes a first substrate, a second substrate opposite to the first substrate, a liquid crystal layer between the first substrate and the second substrate, a first polarizer arranged on one side of the first substrate facing away the liquid crystal layer, a reflective layer between the second substrate and the liquid crystal layer, a half-wave plate arranged on one side of the liquid crystal layer facing toward the first substrate within the reflective area, and a second polarizer on one side of the second substrate facing away the liquid crystal layer. The half-wave plate includes a first half-wave plate and a second half-wave plate adjacent to each other. In this way, the viewing angle may be enlarged.

13 Claims, 3 Drawing Sheets

(51) Int. Cl.
*G02F 1/13363* (2006.01)
*G02F 1/1333* (2006.01)
(52) U.S. Cl.
CPC ............ *G02F 2001/133638* (2013.01); *G02F 2201/121* (2013.01); *G02F 2201/123* (2013.01); *G02F 2413/02* (2013.01); *G02F 2413/06* (2013.01)

COLOR FILM SUBSTRATES AND THE TRANSFLECTIVE LIQUID CRYSTAL DEVICES (LCDS) HAVING WIDE VIEWING ANGLE

BACKGROUND OF THE INVENTION

1. Field of the Invention

The present disclosure relates to display technology, and more particularly to a color film substrate and a transflective LCD having wide viewing angle.

2. Discussion of the Related Art

LCD panels generally include a color film substrate and an array substrate opposite to the color film substrate, and wherein a liquid crystal layer is encapsulated within the space encapsulated between the two substrates. As the liquid crystal molecules do not emit lights themselves, a light source is needed for the display panel to display images. The LCDs may include transmission, reflective, and transflective LCDs.

The transmission liquid crystal panel mainly adopt the backlight source as the light source, wherein the backlight source is arranged behind the liquid crystal panel. The pixel electrode on the array substrate may be the transparent electrode operating as a transmission area.

Regarding the reflective liquid crystal panel, usually, a front light source or an external light source is adopted. The array substrate may adopt the reflective electrodes, which are made by materials such as metal or other materials having good reflective characteristics, as the transmission area, so as to reflect the light beams from the front light source or the external light source.

The transflective liquid crystal panels may be viewed as combination of the transmission and the reflective panels. On the array substrates, not only the reflective area, but also the transmission area are configured thereon. At the same time, the backlight source and the front source may be adopted at the same time.

The advantage of the transmission LCDs resides in that the transmission LCD may display bright images in a dark environment, and the shortcoming is that the light beams passing through the liquid crystal panel are only a small portion of the light beams emitting by the backlight source, that is, the utilization rate of the backlight source is not high. In order to enhance the brightness of the backlight source, the power consumption of the backlight source may be greatly increased.

The reflective LCDs may utilize the external light source to reduce the power consumption, but the reflective LCDs reply on the external light source and cannot display images in a dark environment.

The transflective LCDs include the advantages of the transmission and the reflective LCDs. That is, the transflective LCDs may display bright images in a dark environment, such as indoor, and also may be adopted in portable electronic devices, such as cellular phones, digital cameras, palms, GPRS and so on, so as to operate in outdoor.

However, the viewing angle of the transflective LCD may be small, which results in distortion when the viewing angle is not the optimal one. The viewing angle relates to the angles formed by visual line and the normal of the transflective LCD.

SUMMARY

The object of the invention is to provide a color film substrate and a transflective LCD having wide viewing angle, which may effectively increase the viewing angle of the transflective LCDs to avoid the distortion when the viewing angle is not the optimal one.

In one aspect, a transflective liquid crystal device (LCD) having wide viewing angle includes:

a transmission area, and a reflective area; a first substrate, a second substrate opposite to the first substrate, a liquid crystal layer between the first substrate and the second substrate, and a reflective layer between the second substrate and the liquid crystal layer; a first polarizer, a second polarizer, and a half-wave plate; wherein the first polarizer is arranged on one side of the first substrate facing away the liquid crystal layer, the second polarizer is arranged on one side of the second substrate facing away the liquid crystal layer, and an optical axis direction of the first polarizer and the second polarizer are respectively zero and 90 degrees; the half-wave plate is arranged on one side of the first substrate facing toward the liquid crystal layer and the first substrate is within the transmission area; and the half-wave plate includes a first half-wave plate and a second half-wave plate adjacent to each other, the optical axis direction of the first half-wave plate is perpendicular to that of the second half-wave plate, the optical axis direction of the first half-wave plate is 45 degrees, the optical axis direction of the second half-wave plate is 45 degrees, and a dimension of the first half-wave plate equals to the dimension of the second half-wave plate.

Wherein the LCD further includes a resin layer between the reflective and the second substrate.

Wherein a pixel electrode on the second substrate corresponding to the transmission area is a transparent electrode, and the pixel electrode on the second substrate corresponding to the reflective area is a reflective electrode.

In another aspect, a color film substrate includes: a transmission area, and a reflective area; a glass substrate and a common electrode being stacked; a color film polarizer and at least one half-wave plate; wherein the color film polarizer is arranged on one side of the glass substrate facing away the common electrode, and an optical axis direction of the color film polarizer may be 0 or 90 degrees; the half-wave plate is arranged on one side of the common electrode facing away the glass substrate, and the half-wave plate covers the common electrode corresponding to the reflective area; and the half-wave plate includes a first half-wave polarizer and a second half-wave polarizer adjacent to each other, the optical axis direction of the first half-wave polarizer is perpendicular to that of the second half-wave polarizer, the optical axis direction of the first half-wave polarizer is in a range between 30 and 60 degrees, and the optical axis direction of the second half-wave polarizer is in the range between −60 and −30 degrees.

Wherein the optical axis direction of the first polarizer and the second polarizer are respectively 45 and −45 degrees.

Wherein a dimension of the first half-wave plate is equal to that of the second half-wave plate.

Wherein a dimension of the first half-wave plate is larger than or smaller than that of the second half-wave plate.

In another aspect, a transflective LCD having wide viewing angle includes: a transmission area, and a reflective area; a first substrate, a second substrate opposite to the first substrate, a liquid crystal layer between the first substrate and the second substrate, and a reflective layer between the second substrate and the liquid crystal layer; a first polarizer, a second polarizer, and a half-wave plate; wherein the first polarizer is arranged on one side of the first substrate facing away the liquid crystal layer, the second polarizer is arranged on one side of the second substrate facing away the liquid crystal layer, and an optical axis direction of the first polarizer and the second polarizer are respectively zero and 90 degrees; the half-wave plate is arranged on one side of the first substrate facing toward the liquid crystal layer and the first substrate is within the transmission area; and the half-wave plate includes a first half-wave plate and a second half-wave plate adjacent to each other, the optical axis direction of the first half-wave plate is perpendicular to that of the second half-wave plate, the optical axis direction of the first half-wave plate is in a range between 30 and 60 degrees, and the optical axis direction of the second half-wave plate is in the range between −60 and −30 degrees.

Wherein the optical axis direction of the first half-wave plate and the second half-wave plate are respective 45 and −45 degrees.

Wherein a dimension of the first half-wave plate is equal to that of the second half-wave plate.

Wherein a dimension of the first half-wave plate is larger than or smaller than that of the second half-wave plate.

Wherein the LCD further includes a resin layer between the reflective and the second substrate.

Wherein a pixel electrode on the second substrate corresponding to the transmission area is a transparent electrode, and the pixel electrode on the second substrate corresponding to the reflective area is a reflective electrode.

In view of the above, the first polarizer, the second polarizer, and the half-wave plate are configured within the transflective LCD having wide viewing angle. As the half-wave plate may change the optical axis direction of the light beams passing through the first polarizer, the viewing angle of the reflective area toward the transmission area may be compensated. As such, the viewing angle is enlarged, and the display performance from every aspect may be improved, which avoids the distortion occurring when the viewing angle is not the optimal ones.

DETAILED DESCRIPTION OF THE EMBODIMENTS

Embodiments of the invention will now be described more fully hereinafter with reference to the accompanying drawings, in which embodiments of the invention are shown.

Figure 1:
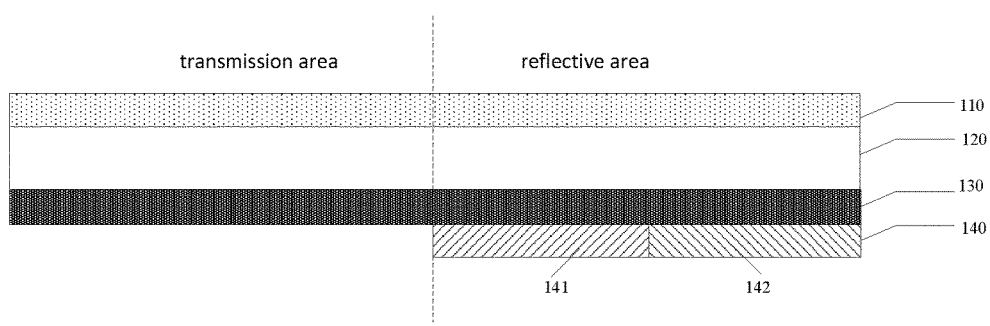
FIG. 1 is a cross-sectional view of the color film substrate in accordance with one embodiment.

FIG. 1 is a cross-sectional view of the color film substrate in accordance with one embodiment. The color film substrate includes a transmission area and a reflective area. The transmission area is configured for the light beams to be passed through from the color film substrate, and the reflective area is configured for the light beams entering the color film substrate to be reflected. The color film substrate includes a color film polarizer 110, a glass substrate 120, a common electrode 130, and a half-wave plate 140 stacked in sequence.

The color film polarizer 110 is arranged on one side of the glass substrate 120 facing away the common electrode 130, and The optical axis direction of the color film polarizer 110 may be 0 or 90 degrees.

The half-wave plate 140 is arranged on one side of the common electrode 130 facing away the glass substrate 120, and the half-wave plate 140 covers the common electrode 130 corresponding to the reflective area.

The half-wave plate 140 includes a first half-wave plate 141 and a second half-wave plate 142 adjacent to each other. The optical axis direction of the first half-wave plate 141 is perpendicular to that of the second half-wave plate 142. The optical axis direction of the first half-wave plate 141 may be in a range between 30 and 60 degrees, and The optical axis direction of the second half-wave plate 142 may be in the range between −60 and −30 degrees.

The light beams having the optical axis direction equaling to 0 or 90 degrees may pass through the color film polarizer 110.

The half-wave plate 140 is configured for changing the optical axis direction of the light beams from the reflective area passing through the color film polarizer 110. That is, the optical axis direction of the light beams passing through the first half-wave plate 141 is in the range between 30 and 60 degrees, and the optical axis direction of the light beams passing through the second half-wave plate 142 is in the range between −60 and −30 degrees.

Further, the optical axis direction of the first half-wave plate 141 and of the second half-wave plate 142 are respectively 45 and −45 degrees.

In addition, the dimension of the first half-wave plate 141 is equal to that of the second half-wave plate 142. That is, the length of a long side of the first half-wave plate 141 is equal to the length of the long side of the second half-wave plate 142. The dimension of the first half-wave plate 141 covering the common electrode 130 is equal to the dimension of the second half-wave plate 142 covering the common electrode 130.

In one example, the dimension of the first half-wave plate 141 may be larger than or smaller than the dimension of the second half-wave plate 142. That is, the length of the long side of the first half-wave plate 141 may be larger than or smaller than the length of the long side of the second half-wave plate 142. The length of the short side of the first half-wave plate 141 is equal to the length of the short side of the second half-wave plate 142. The dimension of the first half-wave plate 141 covering the common electrode 130 may be larger than or smaller than the dimension of the second half-wave plate 142 covering the common electrode 130.

As the half-wave plate may change the optical axis direction of the reflective area so as to compensate the viewing angle of the transmission area, which enlarges the performance of the wide viewing angle.

In the embodiment, the half-wave plate 140 may be made by the same materials with the color film polarizer 110. The materials of the color film polarizer 110 and the half-wave plate 140 may be made by conventional materials of the polarizers, and thus are not limited.

In the above embodiments, the optical axis direction may be changed by increasing the color film polarizer and the half-wave plate on the color film substrate. As such, the viewing angle of the transmission area may be compensated so as to enlarge the viewing angle.

Figure 2:
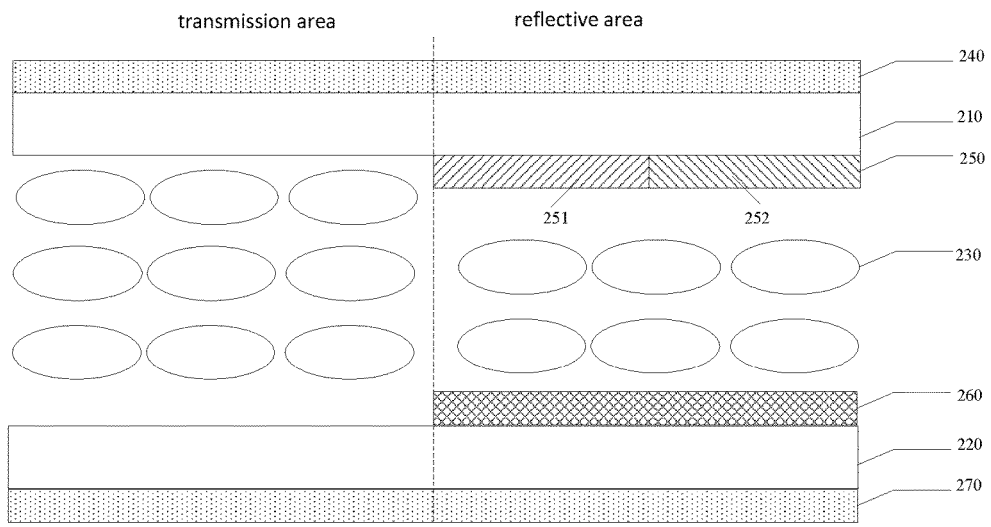
FIG. 2 is a cross-sectional view of the transflective LCD having wide viewing angle in accordance with one embodiment.

FIG. 2 is a cross-sectional view of the transflective LCD having wide viewing angle in accordance with one embodiment. In the embodiment, the pixel area of the LCD may include the transmission area and the reflective area. The transmission area is configured for pass through the light beams emitted from the backlight source outward, and the reflective area is configured for reflecting the light beams entering the color film substrate.

In the embodiment, the LCD includes a first substrate 210, a second substrate 220, a liquid crystal layer 230 between the first substrate 210 and the second substrate 220, a first polarizer 240, a half-wave plate 250, a reflective layer 260, and a second polarizer 270.

The first substrate 210 is the color film substrate, the first polarizer 240 is the array substrate, the half-wave plate 250 is the half-wave plate, that is, λ/2 plate, wherein λ relates to the wavelength of the light beams.

The first polarizer 240 is arranged on one side of the first substrate 210 facing away the liquid crystal layer 230, the half-wave plate 250 is arranged on one side of the first substrate 210 facing toward the liquid crystal layer 230 and corresponding to the reflective area, that is, between the first substrate 210 and the liquid crystal layer 230. The reflective layer 260 is arranged between liquid crystal layer 230 and the first polarizer 240 corresponding to the reflective area. The second polarizer 270 is arranged on one side of the first polarizer 240 facing away the liquid crystal layer 230.

The optical axis direction of the first polarizer 240 is perpendicular to that of the second polarizer 270. In the embodiment, the optical axis direction of the first polarizer 240 is zero degree, and the optical axis direction of the second polarizer 270 is 90 degrees. In other embodiment, the optical axis direction of the first polarizer 240 is 90 degrees, and the optical axis direction of the second polarizer 270 is zero degree.

The half-wave plate 250 includes a first half-wave polarizer 251 and a second half-wave polarizer 252 adjacent to each other. The optical axis direction of the first half-wave polarizer 251 is perpendicular to that of the second half-wave polarizer 252. The optical axis direction of the first half-wave polarizer 251 is in the range between 30 and 60 degrees, and the optical axis direction of the second half-wave polarizer 252 is in the range between −60 and −30 degrees.

The half-wave plate 140 includes a first half-wave plate 141 and a second half-wave plate 142 adjacent to each other. The optical axis direction of the first half-wave plate 141 is perpendicular to that of the second half-wave plate 142. The optical axis direction of the first half-wave plate 141 may be in a range between 30 and 60 degrees, and the optical axis direction of the second half-wave plate 142 may be in the range between −60 and −30 degrees.

In the embodiment, within the transmission area, the light beams emit out from the backlight source of the LCD, pass through the second polarizer 270, the first polarizer 240, the liquid crystal layer 230, the first substrate 210, and then emit out from the first polarizer 240. Within the reflective area, the light beams are the ambient light beams entering the first polarizer 240, passing through the first substrate 210, the liquid crystal layer 230, and arriving on the reflective layer 260. The light beams reflected by the reflective layer 260 pass through the liquid crystal layer 230, the first substrate 210, and then emit out via the first polarizer 240.

The light beams having optical axis direction equaling to zero degree may pass through the first polarizer 240, and the light beams having optical axis direction equaling to 90 degrees may pass through the second polarizer 270.

Specifically, within the transmission area, the light beams emitted from the backlight source having the optical axis direction equaling to zero degree may pass through the second polarizer 270. The light beams passing through the second polarizer 270 and the second substrate 220 may be affected by the liquid crystal layer 230. As such, the optical axis direction of the light beams may be twisted to some degrees. Afterward, the light beams pass through the first substrate 210 and arrive the first polarizer 240. The light beams having the optical axis direction equaling to 90 degrees may emit out from the first polarizer 240 so as to display the images.

Figure 3:
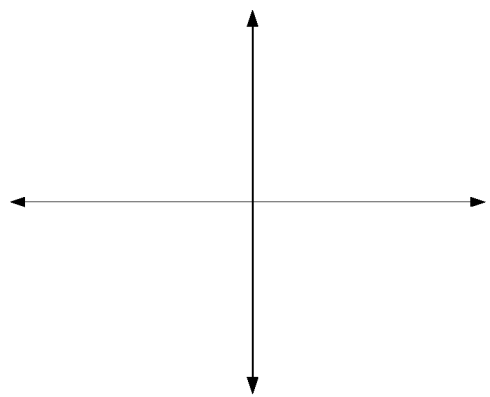
FIG. 3 is a schematic view of the directions of the optical axis in accordance with one embodiment.

FIG. 3 is a schematic view of the directions of the optical axis in accordance with one embodiment. As shown in FIG. 3, the optical axis direction of each of the pixel areas are zero and 90 degree(s).

Figure 4:
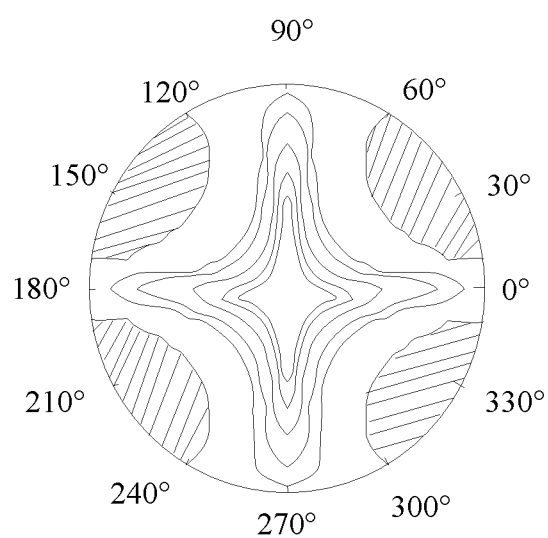
FIG. 4 is a schematic view of the viewing angles corresponding to the optical axis of 0 and 90 degrees in accordance with one embodiment.

FIG. 4 is a schematic view of the viewing angles corresponding to the optical axis of 0 and 90 degrees in accordance with one embodiment, wherein shadow portions are the areas having bad viewing angles.

As shown in FIG. 4, the viewing angle performance is better when the optical axis direction is zero or 90 degree(s), and the viewing angle performance is bad when the optical axis direction is 45 or −45 degrees. It can be seen that the shadow portions are the areas having the optical axis direction equaling to 45 and −45 degrees.

Within the reflective area, the first polarizer 240 permits the ambient lights having the optical axis direction equaling to zero degree to pass through the first polarizer 240. The ambient lights also pass through the first substrate 210, the first half-wave polarizer 251 or the second half-wave polarizer 252 and then entering the liquid crystal layer 230. The light beams having the optical axis direction in the range between 30 and 60 degrees entering from the first half-wave polarizer 251, and the light beams having the optical axis direction in the range of −60 and −30 degrees entering from the second half-wave polarizer 252 in the range of −60 and −30 degrees entering from the second half-wave polarizer 252. The optical axis direction of the incident light beams transits from zero degree into the range between 30 and 60 degrees and the range between −60 and −30 degrees under the effect of the half-wave plate 250.

The light beams entering the liquid crystal layer 230 and are subject to the liquid crystal layer 230, the optical axis direction of the light beams are twisted to some extent. Afterward, the light beams pass through the liquid crystal layer 230 and enter the reflective layer 260. The light beams are reflected by the reflective layer 260 and then being affected by the liquid crystal layer 230, and then enter the first substrate 210. In the end, the light beams pass through the second half-wave polarizer 252 and emit out from the first half-wave polarizer 251 so as to display the images.

The reflected light beams having optical axis direction in the range of 30 and 60 degrees emit out from the first half-wave polarizer 251, and the reflected light beams having optical axis direction in the range of −60 and −30 degrees emit out from the second half-wave polarizer 252.

It can be understood that the pixel electrode on the second substrate 220 corresponding to the transmission area is the transparent electrode, and the pixel electrode on the second substrate second substrate 220 corresponding to the reflective area is the reflective electrode.

Further, the optical axis direction of the first half-wave polarizer 251 and the second half-wave polarizer 252 are respectively 45 and −45 degrees. The optical axis direction of the first half-wave polarizer 251 may be 45 degrees, and the optical axis direction of the second half-wave polarizer 252 may be −45 degrees.

Figure 5:
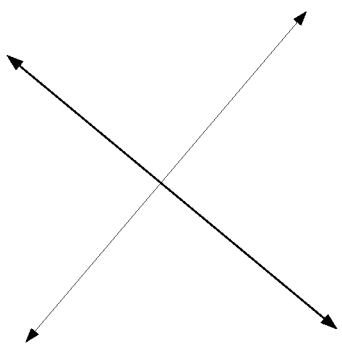
FIG. 5 is a schematic view of The optical axis direction in accordance with another embodiment.

FIG. 5 is a schematic view of The optical axis direction in accordance with another embodiment. Under the effect of the half-wave plate 250, the optical axis direction of the incident light beams transits from zero degree to 45 and −45 degrees. Within the same reflective area, the second half-wave polarizer 252 is arranged to be adjacent to the second half-wave polarizer 252. The combined optical axis direction may be 45/−45 degrees. As such, the optical axis directions of each of the pixel areas within the reflective area are 45/−45 degrees.

Figure 6:
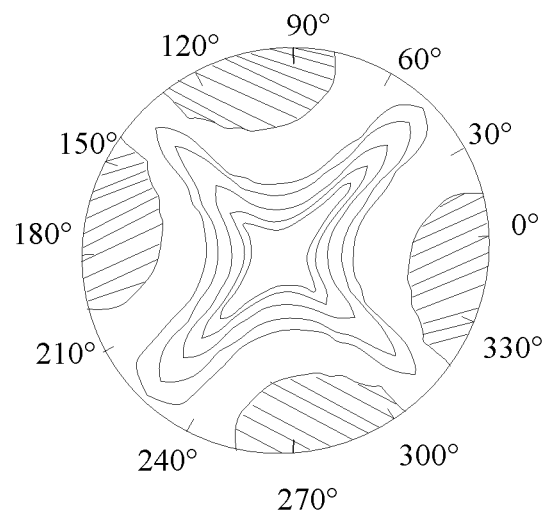
FIG. 6 is a schematic view of the viewing angles corresponding to the optical axis of 45 and −45 degrees in accordance with one embodiment.

FIG. 6 is a schematic view of the viewing angles corresponding to the optical axis of 45 and −45 degrees in accordance with one embodiment, wherein shadow portions are the areas having bad viewing angles.

As shown in FIG. 6, the viewing angle performance is better when the optical axis direction is 45/−45 degree, and the viewing angle performance is bad when the optical axis direction is zero or 90 degree(s). It can be seen that the shadow portions are the areas having the optical axis direction equaling to zero/−90 degrees.

In this way, within the reflective area, the optical axis direction equaling to 45/−45 degrees may own better viewing angle, which compensates the issue that within the transmission area, the viewing angle may be bad when the optical axis direction equals to 45/−45 degree. As such, the viewing angle may be wide viewing angle in every aspects.

Further, the dimension of the first half-wave plate 251 is equal to that of the second half-wave plate 252. That is, the length of a long side of the first half-wave plate 251 is equal to the length of the long side of the second half-wave plate 252. The dimension of the first half-wave plate 251 covering the first substrate 210 is equal to the dimension of the second half-wave plate 142 covering the first substrate 210.

In one example, the dimension of the first half-wave plate 251 may be larger than or smaller than the dimension of the second half-wave plate 252. That is, the length of the long side of the first half-wave plate 251 may be larger than or smaller than the length of the long side of the second half-wave plate 252. The length of the short side of the first half-wave plate 251 is equal to the length of the short side of the second half-wave plate 252. The dimension of the first half-wave plate 251 covering the first substrate 210 may be larger than or smaller than the dimension of the second half-wave plate 252 covering the first substrate 210.

As the half-wave plate may change the optical axis direction of the reflective area so as to compensate the viewing angle of the transmission area, which enlarges the performance of the wide viewing angle.

In the embodiment, the half-wave plate 250 may be made by the same materials with the first polarizer 240, and the second polarizer 270. The materials of the first polarizer 240, the second polarizer 270, and the half-wave plate 250 may be made by conventional materials of the polarizers, and thus are not limited.

In addition, in one embodiment, the transflective LCD having wide viewing angle may also include a resin layer (not shown) between the reflective layer 260 and the second substrate 220. The resin layer is made by photosensitive resin materials for enhancing the sensibility with respect to the lights and for strengthening the reflection effect.

In view of the above, the first polarizer, the second polarizer, and the half-wave plate are configured within the transflective LCD having wide viewing angle. As the half-wave plate may change the optical axis direction of the light beams passing through the first polarizer, the viewing angle of the reflective area toward the transmission area may be compensated. As such, the viewing angle is enlarged, and the display performance from every aspect may be improved, which avoids the distortion occurring when the viewing angle is not the optimal ones.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A transflective liquid crystal device (LCD) having wide viewing angle, comprising:
   a transmission area, and a reflective area;
   a first substrate, a second substrate opposite to the first substrate, a liquid crystal layer between the first substrate and the second substrate, and a reflective layer between the second substrate and the liquid crystal layer;
   a first polarizer, a second polarizer, and a half-wave plate;
   wherein the first polarizer is arranged on one side of the first substrate facing away the liquid crystal layer, the second polarizer is arranged on one side of the second substrate facing away the liquid crystal layer, and an optical axis direction of the first polarizer and the second polarizer are respectively zero and 90 degree(s);
   the half-wave plate is arranged on one side of the first substrate facing toward the liquid crystal layer and the first substrate is within the transmission area; and
   the half-wave plate comprises a first half-wave plate and a second half-wave plate adjacent to each other, the optical axis direction of the first half-wave plate is perpendicular to that of the second half-wave plate, the optical axis direction of the first half-wave plate is 45 degrees, the optical axis direction of the second half-wave plate is 45 degrees, and a dimension of the first half-wave plate equals to the dimension of the second half-wave plate.

2. The LCD as claimed in claim 1, wherein the LCD further comprises a resin layer between the reflective layer and the second substrate.

3. The LCD as claimed in claim 1, wherein a pixel electrode on the second substrate corresponding to the transmission area is a transparent electrode, and the pixel electrode on the second substrate corresponding to the reflective area is a reflective electrode.

4. A color film substrate, comprising:
   a transmission area, and a reflective area;
   a glass substrate and a common electrode being stacked;
   a color film polarizer and at least one half-wave plate;
   wherein the color film polarizer is arranged on one side of the glass substrate facing away the common electrode, and an optical axis direction of the color film polarizer may be 0 or 90 degrees;
   the half-wave plate is arranged on one side of the common electrode facing away the glass substrate, and the half-wave plate covers the common electrode corresponding to the reflective area; and
   the half-wave plate comprises a first half-wave plate and a second half-wave plate adjacent to each other, the optical axis direction of the first half-wave plate is perpendicular to that of the second half-wave plate, the optical axis direction of the first half-wave plate is in a range between 30 and 60 degrees, and the optical axis direction of the second half-wave plate is in the range between −60 and −30 degrees.

5. The color film substrate as claimed in claim 4, wherein the optical axis direction of the first polarizer and the second polarizer are respectively 45 and −45 degrees.

6. The color film substrate as claimed in claim 4, wherein a dimension of the first half-wave plate is equal to that of the second half-wave plate.

7. The color film substrate as claimed in claim 4, wherein a dimension of the first half-wave plate is larger than or smaller than that of the second half-wave plate.

8. A transflective LCD having wide viewing angle, comprising:
   a transmission area, and a reflective area;
   a first substrate, a second substrate opposite to the first substrate, a liquid crystal layer between the first substrate and the second substrate, and a reflective layer between the second substrate and the liquid crystal layer;
   a first polarizer, a second polarizer, and a half-wave plate;
   wherein the first polarizer is arranged on one side of the first substrate facing away the liquid crystal layer, the second polarizer is arranged on one side of the second substrate facing away the liquid crystal layer, and an optical axis direction of the first polarizer and the second polarizer are respectively zero and 90 degree(s);
   the half-wave plate is arranged on one side of the first substrate facing toward the liquid crystal layer and the first substrate is within the transmission area; and the half-wave plate comprises a first half-wave plate and a second half-wave plate adjacent to each other, the optical axis direction of the first half-wave plate is perpendicular to that of the second half-wave plate, the optical axis direction of the first half-wave plate is in a range between 30 and 60 degrees, and the optical axis direction of the second half-wave plate is in the range between −60 and −30 degrees.

9. The LCD as claimed in claim 8, wherein the optical axis direction of the first half-wave plate and the second half-wave plate are respective 45 and −45 degrees.

10. The LCD as claimed in claim 8, wherein a dimension of the first half-wave plate is equal to that of the second half-wave plate.

11. The LCD as claimed in claim 8, wherein a dimension of the first half-wave plate is larger than or smaller than that of the second half-wave plate.

12. The LCD as claimed in claim 8, wherein the LCD further comprises a resin layer between the reflective layer and the second substrate.

13. The LCD as claimed in claim 8, wherein a pixel electrode on the second substrate corresponding to the transmission area is a transparent electrode, and the pixel electrode on the second substrate corresponding to the reflective area is a reflective electrode.

* * * * *